United States Patent

[11] 3,617,554

[72] Inventor  Charles H. Thorborg
              Succasunna, N.J.
[21] Appl. No. 42,794
[22] Filed     June 2, 1970
               Division of Ser. No. 744,076, July 11, 1968
[45] Patented  Nov. 2, 1971
[73] Assignee  Gulf Degremont, Inc.
               Bridgewater Township, N.J.

[54] DESALTING AND PURIFYING WATER BY CONTINUOUS ION EXCHANGE
     5 Claims, 1 Drawing Fig.
[52] U.S. Cl.................................................. 210/26, 210/33
[51] Int. Cl. ................................................ B01d 15/02, B01d 15/06
[50] Field of Search ........................................ 210/26, 32, 33, 37, 38

[56]              References Cited
              UNITED STATES PATENTS
2,841,550   7/1958   Beohner ....................... 210/38 X
3,156,644   11/1964  Kunin ........................... 210/26 X
3,420,773   1/1969   Selmeczi ....................... 210/38 X Primary Examiner—Samih N. Zaharna
Attorney—Browdy and Neimark ABSTRACT: A method and apparatus are provided for the continuous treatment of brackish water, sea water, industrial wastes or sewage effluents using continuous ion exchange. Three units are provided in series, the raw water entering the first unit and purified water leaving the third unit. While the water moves continuously through the three units, an ion exchange resin is caused to flow countercurrent therethrough, a weak base anion exchange resin in the bicarbonate state passing through the first unit and the same resin, in the free base form, passing through the third unit. Passing through the second unit countercurrent to the effluent is a weak acid cation exchange resin. After passage through the first and second units, the resins are regenerated. The third unit is a carbon dioxide degasifier.

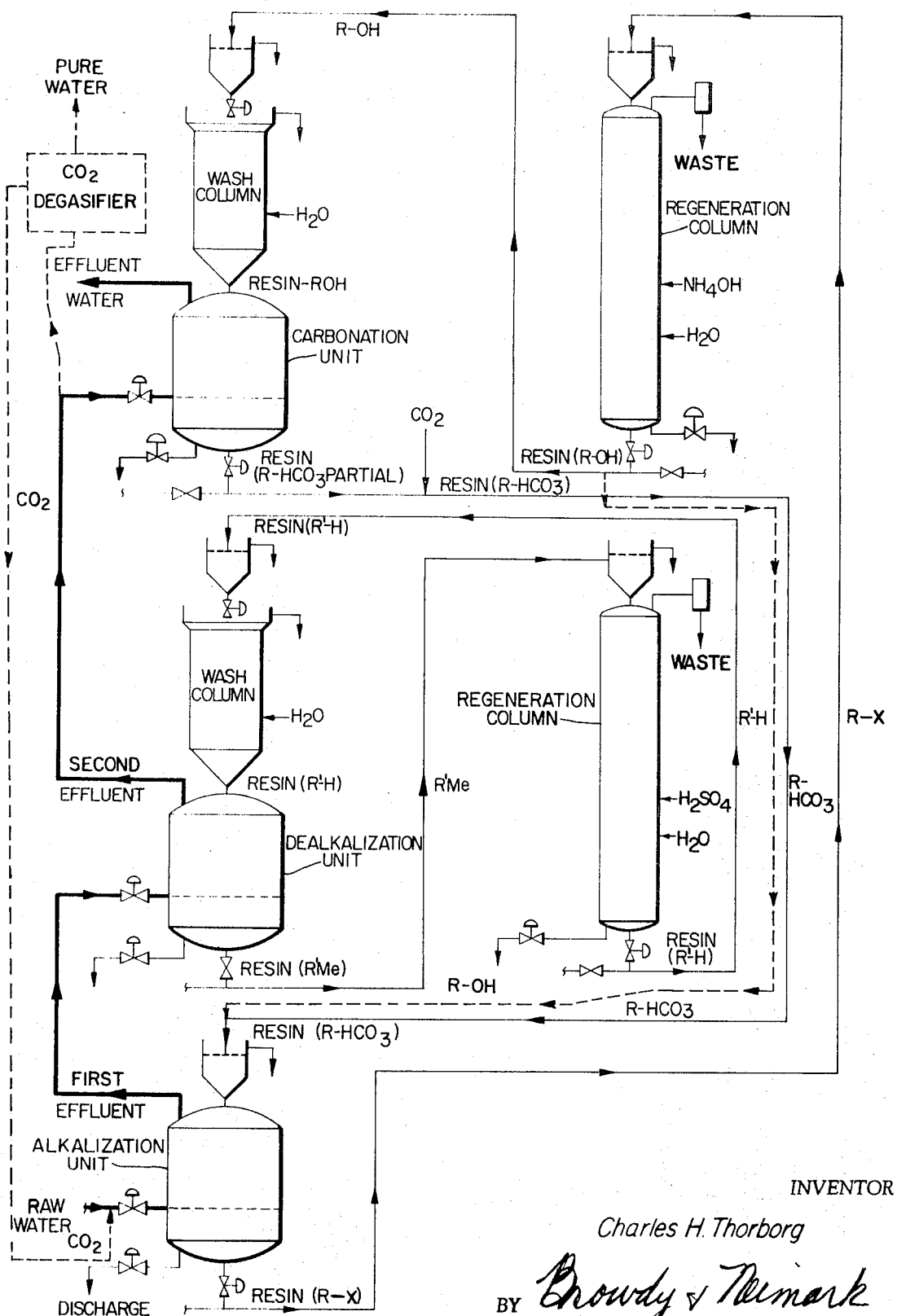

DESALTING AND PURIFYING WATER BY CONTINUOUS ION EXCHANGE

The present application is a division of copending application Ser. No. 744,076 filed July 11, 1968.

The present invention relates to a method and apparatus for desalting and purifying water by continuous ion exchange and, more particularly, to a desalination process for the treatment of brackish water, sea water, industrial wastes and sewage effluents utilizing continuous countercurrent treatment with weak base anion exchange resin and a weak acid cation exchange resin.

The desalination of salt-containing impure water has received a great deal of attention because of the overwhelming world need of fresh water. Prior art developments have been carried out in the fields of distillation, freezing, the use of semipermeable membranes, extraction procedures, ion exchange and combinations of these various procedures.

In recent years, the use of ion exchange for the purification of brackish waters in particular has been advanced by the development and utilization of weak base anion exchange resins and weak acid cation exchange resins. Prior to use of these resins it was found that ion exchange of brackish waters utilizing conventional ion exchange resins was prohibitively expensive due to the large proportion of dissolved solids in brackish water and the limiting factor in the use of conventional ion exchange resins because the cost of regenerant for such resins increased proportionately with the increase in salinity. The great advantage in the weak acid and weak base exchange resins lies in the low cost of their regeneration and their very high efficiency.

However, in spite of the advantages which have been provided in the utilization of such weak base and weak acid ion exchange resins in the desalination of brackish waters, a number of problems have remained. Thus, the cyclic procedures in which these resins have been utilized involve complex piping arrangements which take up excessive factory space and involve high initial cost, and their operation utilizes excessive chemical consumption. In addition, these cyclic operations do not achieve maximum efficiency with respect to the economical removal of solids from the waters treated. In addition, these cyclic operations have used excessive quantities of carbon dioxide for conversion of the weak base anion exchange resins to the bicarbonate form; and have also utilized an excessive volume of wasted water.

It is, accordingly, an object of the present invention to overcome and/or reduce the deficiencies inherent in the prior art, such as indicated above.

It is another object of the present invention to provide a new, unobvious and more efficient system of desalination utilizing ion exchange.

It is another object of the present invention to provide for the continuous, countercurrent ion exchange desalination of ion-containing waters.

It is another object of the present invention to use countercurrent exchange both in treatment and in regeneration to improve the efficiency of maximum solid removal from salt-containing water, thereby increasing economy.

It is another object of the present invention to reduce chemical consumption in the removal of ions from salt-containing water.

It is another object of the present invention to reduce the makeup of carbon dioxide as the continuous ion exchange process completely exhausts the resin, thus allowing almost complete conversion to the bicarbonate form in the carbonation column.

It is another object of the present invention to reduce the floorspace required in a desalination system without reducing the efficiency.

It is another object of the present invention to reduce the size of reaction vessels due to the use of high flow velocities utilized in the continuous ion exchange of the present invention.

It is another object of the present invention to greatly simplify the piping arrangement normally required in ion exchange apparatus utilizing weak base anion exchange resins.

It is another object of the present invention to reduce the volume of water wasted as compared to known systems.

It is yet another object of the present invention to reduce the equipment installation costs by providing simplified structure.

These and other objects in the nature and advantages of the instant invention will be more apparent from the following detailed description of the invention taken in conjunction with the drawing which shows a flow diagram of an embodiment of the present invention.

Briefly, raw water, such as brackish water, is fed continuously to the bottom of an alkalization unit which receives at the top thereof continuously and countercurrent to the flow of such water a weak anion exchange resin in the bicarbonate form $R-HCO_3$. The resin exchanges raw water anions for bicarbonate. The resin leaves the unit at the bottom thereof in the salt form R–X (i.e. chloride, sulfate, nitrate, etc.) equal to the raw water analysis while the water, designated first effluent leaves the top of the alkalization unit containing bicarbonate impurities (calcium bicarbonate, magnesium bicarbonate, etc.). The resin R–X leaving the bottom of the alkalization unit is transferred to a regeneration column where it is converted to its free base form with a suitable regenerant, such as ammonia, lime, etc.

In the meantime, the water or first effluent is passed upwardly from the alkalization unit to the bottom of the dealkalization unit which is charged at its upper end with a weak acid cation exchange resin in the hydrogen form $R'-H$. The resin flowing continuously downwardly countercurrent to the upward flow of the effluent exchanges the cations therein for hydrogen. The released hydrogen reacts with the bicarbonate present thereby leaving pure water and carbon dioxide (plus any slippage of ions through the resins). The resin leaves the bottom of the dealkalization unit in the metal form $R'-Me$ (containing calcium, magnesium sodium etc.) and is transferred to a regeneration column where it is converted countercurrently back to the hydrogen form $R'-H$ with a suitable acid regenerant such as sulfuric acid. The resin is then again recycled to the top of the dealkalization unit.

The second effluent comprising pure water and carbon dioxide leaving the top of the dealkalization unit is then passed to the bottom of a carbonation unit through which such effluent flows countercurrent to the weak base anion exchange resin in its free base form R–OH which is fed to the top of the carbonation unit. The resin in its free base form is converted to the bicarbonate form $R-HCO_3$ by the carbon dioxide present in the effluent, and such converted resin is then passed from the bottom of the carbonation unit to the top of the alkalization unit as previously described. Any required makeup of carbon dioxide needed to complete carbonation of the weak base anion exchange resin is added during the transfer of the resin from the carbonation unit to the alkalization unit. The water leaves the top of the carbonation unit suitable for most uses such as drinking, industrial uses, irrigation, etc.; if desired, however, the water may be then passed to a further polishing zone to provide ultra-pure water.

As will be apparent from the flow diagram, it is advantageous to wash the ion exchange resins prior to feeding thereof to the carbonation unit and the dealkalization unit. This and other details of operation including relative flow rates, etc. will be readily apparent to those having normal skill in the art.

The preferred ion exchange resins used in the present invention are manufactured by Rohm and Haas and are sold under the trade names "Amberlite IRA–68" (the weak base anion exchange resin) and "Amberlite IRC–84" (the weak acid cation exchange resin). "Amberlite IRA–68" is a synthetic resin provided in spherical bead form of 16–50 U.S. Standard Mesh having a weight of 46 pounds per cubic foot and containing tertiary amine functional groups. "Amberlite IRC–84" is a carboxylic cation exchange resin provided as spherical particles of 16–50 U.S. Standard Mesh and having a weight of 47 pounds per cubic foot. While these two commercially available ion exchange resins are preferred, it will be understood that other resins, having similar properties, may be used in that place. A number of other weak base anion exchange resins and weak acid cation exchange resins are presently commercially available; one such weak acid cation exchange resin is "Zerolit 216" which is a condensation production containing both phenolic and carboxylic groups. Another weak acid cation exchange resin is "Amberlite IRC-50."

While the present invention has been described with respect to a three-column system, it will be understood that the present invention may be utilized preferably with six columns, and may be utilized with as few as only two columns together with a carbon dioxide degasifier.

The present invention and its advantages will be better understood by reference to the following operative examples, which it is understood are not limitative but are merely exemplary:

EXAMPLE 1

A three absorption column system such as shown in the FIGURE is utilized. The weak base anion exchange resin used is "Amberlite IRA-68." The raw water fed to the alkalization unit (the first column) is brackish water containing sodium, calcium and magnesium anions and chloride, sulfate and carbonate cations.

The following reactions typify the reactions occurring in the alkalization unit:

$$R-HCO_3 NaCl \rightleftharpoons R-Cl + NaHCO_3$$
$$R-HCO_3 CaSO_4 \rightleftharpoons R-SO_4 + CaHCO_3,$$

wherein R signifies the weak base anion exchange resin.

The effluent passing from the alkalization unit to the dealkalization unit contains sodium bicarbonate, calcium bicarbonate and magnesium bicarbonate. This effluent is fed to the bottom of the dealkalization unit while, countercurrent therewith, "Amberlite IRC-84" in hydrogen form is fed to the top of the dealkalization unit. The typical reactions occurring in the dealkalization unit are as follows:

$$R'-H + NaHCO_3 \rightleftharpoons R'-Na + CO_3H$$
$$R'-H + CaHCO_3 \rightleftharpoons R'-Ca + CO_3H,$$

wherein R' signifies the weak acid cation exchange resin.

The effluent passing from the dealkalization unit to the bottom of the carbonation unit contains $CO_3H$. The "Amberlite IRA-68" is fed to the top of the carbonation unit in its free base form and the reaction occurring is:

$$R-OH + CO_3H \rightarrow R-CO_3H$$

The weak base anion exchange resin fed to the top of the alkalization unit from the bottom of the carbonation unit is signified by the formula $R-HCO_3$. After treatment in the alkalization unit, the unregenerated resin is signified by the formula R-X, e.g. R-Cl or R-SO$_4$. After regeneration with a suitable regenerant such as sodium hydroxide or calcium hydroxide, but preferably ammonia, the weak base anion exchange resin as it is fed to the top of the carbonation unit has the empirical formula R-OH. In the above formula, R signifies the weak base anion exchange resin and X signifies the exchangeable anionic material including chloride, sulfate and nitrate.

The weak acid cation exchange resin is fed to the top of the dealkalization unit in its free acid form and is designated by the formula R'H. This resin leaves the bottom of the dealkalization unit in accordance with the formula R'Me and, after regeneration with a suitable reagent such as sulfuric acid, hydrochloric acid, nitric acid or sulfurous acid, is reconverted to the free acid form as signified by the formula R'H. In the above formula R' signifies the weak acid cation exchange resin and Me signifies the metal cation, such as sodium and calcium.

In the present example, the flow of effluent, various reagents and ion exchange resins are as shown in the FIGURE.

The desalination of brackish water according to the example is economical because of the following factors. The resin regeneration is close to the theoretical (stoichiometric) efficiency with low chemical cost and negligible waste problems because very little excess regenerant is necessary; the ion exchange capacity of the resins is high, thereby necessitating only a low resin investment; there is a minimum water loss for the regeneration operations; and there is a minimal waste disposal problem because the continuous regeneration results in a continuous neutralization of excess regenerant.

EXAMPLE 2

In this procedure only two adsorption columns are used, namely the alkalization unit and the dealkalization unit, together with a $CO_2$ degasifier shown in phantom in the FIGURE. In this system, carbon dioxide, either fresh or that recovered from the degasifier, is added directly to the raw water, as shown by the dash line in the FIGURE, before it is fed to the alkalization unit. The exhausted weak base anion exchange resin leaving the bottom of the alkalization unit is regenerated with ammonia and is returned directly to the top of the alkalization unit as shown by the dash line in the FIGURE. The dealkalization unit is operated as described above. The basic difference is that the first unit combines the functions of the alkalization unit and the carbonation unit so that both reactions occur in this unit.

The foregoing description of the specific embodiments will so fully reveal the general nature of the invention that others can, by applying current knowledge, readily modify such specific embodiments and/or adapt them for various applications without departing from the generic concept and, therefore, such adaptations and modifications should and are intended to be comprehended within the meaning and range of equivalents of the following claims.

What is claimed is:

1. A Method of desalting water comprising
   1. Continuously adding carbon dioxide to raw water;
   2. continuously passing said raw water containing carbon dioxide countercurrent to a weak base anion exchange resin represented by the formula R-OH, wherein R is the resin, to yield a first effluent containing alkali metal and alkaline earth metal bicarbonates;
   3. continuously passing said first effluent countercurrent to a weak acid cation exchange resin represented by the formula R'-H, wherein R' is the resin, to yield a second effluent containing carbon dioxide;
   4. continuously passing the contaminated weak anion exchange resin from step two, now represented by the formula R-X wherein X is an anionic impurity, to a regeneration zone, introducing basic regenerant to said zone and thereby continuously regenerating said resin to the R-OH form and returning said resin to step two;
   5. continuously passing said second effluent from step three to a carbon dioxide degasifier, thereby obtaining pure water and also recovering carbon dioxide;
   6. continuously passing the contaminated weak acid cation exchange resin from step three to a regeneration zone, introducing acidic regenerant to said zone and thereby continuously regenerating said cation exchange resin, and recycling said cation exchange resin to step three; and
   7. recycling carbon dioxide recovered in step five to step one.

2. Apparatus for carrying out the desalting of water comprising
   means to feed carbon dioxide continuously to raw water;
   a combined alkalization and carbonation unit for removing anions from raw water, means to continuously feed said raw water and carbon dioxide to said alkalization and carbonation unit, means to continuously feed weak base anion exchange resin in hydroxyl form to said alkalization and carbonation unit countercurrent to the water flow, means to continuously discharge contaminated anion exchange resin from said alkalization and carbonation unit, and means to continuously discharge a first effluent from said alkalization and carbonation unit;
   a dealkalization unit for receiving said first effluent from said alkalization and carbonation unit and for removing cations from said first effluent to provide a second effluent, means to continuously feed weak acid cation exchange resin in hydrogen form through said dealkalization unit countercurrent to the effluent flow, means to continuously regenerate contaminated weak acid cation exchange resin to provide said resin in hydrogen form, means to continuously pass contaminated weak acid ion exchange resin to said cation regenerating means, means to pass said regenerated weak acid cation exchange resin in hydrogen form from said regenerating means back to said dealkalization unit, and means to continuously discharge said second effluent from said dealkalization unit;

a degasifier for receiving said second effluent from said dealkalization unit and removing the carbon dioxide from said second effluent;

an anion exchange resin regenerating means, means to supply regenerant to said anion resin regenerating means, means to pass contaminated anion exchange resin from said alkalization and carbonation unit to said anion resin regenerating means, and means for passing regenerated anion exchange resin in hydroxyl form to said alkalization and carbonation unit; and means to recycle carbon dioxide from said degasifier to said carbon dioxide feeding means.

3. A process in accordance with claim 1 wherein said basic regenerant in step (4) comprises $NH_4OH$.

4. A process in accordance with claim 1 wherein said acidic regenerant used in step (6) comprises $H_2SO_4$.

5. A process in accordance with claim 1 wherein said resins flow downwardly and said raw water and first effluent flow upwardly in said countercurrent steps (2) and (3).

* * * * *